United States Patent [19]
Behling et al.

[11] 3,853,799
[45] Dec. 10, 1974

[54] BITUMINOUS COMPOSITIONS PREPARED BY BLOWING BLENDS OF BITUMEN, AROMATIC EXTRACT AND EPT RUBBER

[75] Inventors: Rolf-Dieter Behling; Manfred Oelsner, both of Hamburg; Gunther Zenke, Halstenbek, all of Germany

[73] Assignee: The British Petroleum Company Limited, London, England

[22] Filed: Sept. 10, 1970

[21] Appl. No.: 71,196

[30] Foreign Application Priority Data
Sept. 17, 1969 Germany.............................. 1946999

[52] U.S. Cl...................... 260/28.5 AS, 260/28.5 B
[51] Int. Cl. .............................................. C08f 45/52
[58] Field of Search ........ 260/28.5 AS, 28.5 B, 733; 208/6, 5

[56] References Cited
UNITED STATES PATENTS

| | | | |
|---|---|---|---|
| 2,627,498 | 2/1953 | Fink et al................................ | 208/5 |
| 2,802,798 | 8/1957 | Smith........................... | 260/28.5 AS |
| 2,909,498 | 10/1959 | Sayko .......................... | 260/28.5 AS |
| 2,947,697 | 8/1960 | Vierk et al................... | 260/28.5 AS |
| 2,996,467 | 8/1961 | Hawley et al. ................ | 260/28.5 B |
| 3,379,662 | 4/1968 | Bramble et al. ............ | 260/28.5 AS |
| 3,459,695 | 8/1969 | Hedge et al.................. | 260/28.5 AS |
| 3,637,558 | 1/1972 | Verdol et al................. | 260/28.5 AS |
| 3,669,918 | 6/1972 | Raley, Jr...................... | 260/28.5 AS |

OTHER PUBLICATIONS

Nordel Dupont Development Report No. 20, May, 1963, pages 1 and 14 relied upon.
Asphalts and Allied Substances, Abraham, 5th Ed., D. Van Nostrand Co., Inc., 492, 493 relied upon.

*Primary Examiner*—Morris Liebman
*Assistant Examiner*—S. L. Fox

[57] ABSTRACT

The penetration/temperature properties of a bitumen are improved by adding a solvent such as an aromatic extract and a rubber formed from ethylene, propylene and third ethylenic compound (e.g., cyclopentadiene dimer). Sulphur and/or polyolefine (polyethylene) may also be added.

10 Claims, No Drawings

BITUMINOUS COMPOSITIONS PREPARED BY BLOWING BLENDS OF BITUMEN, AROMATIC EXTRACT AND EPT RUBBER

This invention relates to a method of preparing a bituminous composition and in particular to a bituminous composition suitable for use as a roof surfacing material. It is known to use rubber/bitumen mixtures as roof surfacing materials and the ideal properties for this purpose are:

a. High softening point so that the composition does not "melt" in summer.
b. Low Fraass point (i.e. temperature at which the composition becomes brittle) so that the composition does not crack in winter, and
c. No tendency to flow down the roof, e.g. to create ridges.

The invention relates to a process for making a product which has a good performance in respect of the above properties.

According to the invention a bituminous composition, suitable for use as a roof surfacing material, is prepared by blowing a gas which contains elemental oxygen, e.g. air, through a mixture of a bituminous substance, a rubber and a flux oil for extending the rubber. The reaction is conveniently carried out at a temperature within the usual range, i.e. 150°C – 300°C.

The terms "bituminous composition," "bituminous substance" and "bitumen," as used in this specification, shall be understood to have the meaning "asphaltic composition," "asphaltic substance" and "asphalt," respectively, in accordance with the definition ASTM-D8–55 established for "asphalt" by the American Society for Testing Materials.

The rubbers which can be used in the invention are those which do not degrade during the reaction, e.g. copolymers of mono-olefines such as ethylene and propylene and cyclic hydrocarbons with an endocyclic bridge and at least 2 olefinic double bonds such as dicyclopentadiene. The feedstock for blowing preferably contains 2 – 25% wt., e.g. 5 – 15% wt., of the rubber.

The flux oils which are particularly suitable for use in the invention are high boiling aromatic/naphthenic hydrocarbon mixtures such as the aromatic extracts obtained during the refining of lubricating oils, e.g., furfural extracts. The feedstock for blowing preferably contains 10 – 75% wt. of the flux oil.

Preferably the blowing is carried out in two stages. The first stage (initial blowing) is carried out at 220°–230°C and the second stage is carried out at 250°C. The initial blowing is particularly advisable if the bituminous substance tends to oxidise rapidly. In this case the blowing reaction could form high molecular weight oxidation products which are insoluble in the final product and therefore precipitation and separation could occur.

According to a further feature of the invention sulphur and/or polyolefines may be incorporated in the mixture. These give further improvements in the elasticity and homogeneity and they may also reduce the amount of blowing needed.

When a polyolefine, e.g. low pressure polyethylene or low pressure polypropylene, is used without sulphur it is most suitably added about 1 hour before the blowing is completed. The final hour's blowing disperses the polyolefine in the mixture. Suitable concentrations for the polyolefine are 1 – 3% wt. based on the total (blown) mixture.

When sulphur is used without the polyolefine it may be added before during or after the blowing. suitable concentrations of the sulphur are 1 – 4 parts by weight of sulphur to 100 parts by weight of the rubber.

When both sulphur and polyolefine are used as described above it is most convenient to add the polyolefine before the sulphur. Thus the polyolefine is conveniently added at the begining of the reaction, the blowing is maintained until the polyolefine is dispersed and then the sulphur is added.

The products of the invention have good elastic properties and even when they are stored hot little or no separation of the components takes place. In many cases the products are used in conjunction with mineral fillers and the good properties, including a lack of separation is maintained even in the presence of mineral fillers.

The bituminous compositions produced according to the invention are particularly suitable for use as elastic joining compounds, pipe wrapping compounds and pipe spinning compounds, for the production of coating, insulating agents for the electrical engineering industry, for the production of elastic roofing felts and water-proofing felts as well as for heat and sound insulation.

The preparation of several mixtures according to the invention will now be described by way of example. In all of these examples the bitumen was a distillation residue from crude petroleum according to DIN 1995. The flux was a medium aromatic extract obtained by furfural refining of a lubricating oil and the rubber was a copolymer of ethylene, propylene and dicyclopentadiene.

In all cases the flux was incorporated in the rubber by pugging at about 100°C and this mixture was added to the (molten) bitumen in the blowing apparatus.

Table 1 gives composition of the feedstock, blowing conditions and inspection data on the product for 3 examples. It also includes comparative data on two unblown commercial bitumens x and y.

As the figures for Examples 1 to 3 of Table 1 show, the mixtures produced according to the invention have higher softening points and lower breaking points than those known from German Published Patent Application 1,470,744, in which ball and ring softening points of 50° to 60°C and breaking points of −18° to −25°C are quoted.

If one compares the particular temperature ranges between liquefaction (on the basis of the ball and ring softening point) and becoming brittle (on the basis of the Fraass breaking point) of the examples of Table 1 and the examples from DOS 1,470,744, one can see that in the case of the products according to the invention these have been made considerably wider both as compared with the usual commercial blow bitumen and also as compared with the products according to the DOS.

Table 2 illustrates the addition of polyethylene to compositions produced according to the invention. This addition was made 1 hour before the end of blowing so that the final blowing disperses the polyethylene. Table 2 shows that the addition of polyethylene raises the softening point and lowers the penetration without raising the very low Fraass point.

Table 3 illustrates the addition of sulphur alone as well as sulphur and polyethylene mixtures. In example 1b (sulphur only) the sulphur was added at the start of the blowing. In the case of examples 1c and 2 (sulphur and polyethylene) the polyethylene was added at the start of the reaction and the sulphur was added when the polyethylene was dispersed. A short blowing at 220°C gives good relationship between breaking point, softening point and penetration. Example 2 shows that high softening points can be obtained using only 5% weight of the expensive rubber.

Tests were also carried out to show the low tendency of the products to flow down a roof. The tests were carried out by placing a sample on a glass sheet at 45° to the horizontal and maintaining it at 80°C. The flow distance was measured after 5 hours and 24 hours.

As well as tests on the products tests were also carried out on the product filled with powdered limestone.

Table 4 gives the test results and it includes test results on two bitumens for comparison. As well as showing the good properties of materials prepared according to the invention Table 4 also shows the beneficial effect of polyethylene on the flow properties.

TABLE 1

|  |  | INVENTION |  |  | COMPARISON |  |
|---|---|---|---|---|---|---|
| Example |  | 1 | 2 | 3 | X | Y |
| Feedstock |  |  |  |  |  |  |
| Rubber | % by wt. | 12.5 | 12.5 | 10.0 | Commercial bitumen 85/25 | Commercial bitumen 105/15 |
| Flux | % by wt. | 37.5 | 37.5 | 40.0 |  |  |
| Bitumen | % by wt. | 50.0 | 50.0 | 50.0 |  |  |
|  |  | 100.0 | 100.0 | 100.0 |  |  |
| Blowing |  |  |  |  |  |  |
| Temperature, | °C | 250 | 250 | 250 | — | — |
| Time, | hrs. | 13 | 7 | 20 | — | — |
| Properties of Product |  |  |  |  |  |  |
| Softening point, ball & ring, | °C | 92 | 72 | 101 | 84 | 104 |
| Penetration, | mm/10 | 67 | 90 | 44 | 22 | 17 |
| Fraass breaking point, | °C | below −40 | below −40 | −40 | −17 | −10 |
| Penetration index |  | +6.6 | +4.9 | +6.2 | +2.8 | +4.6 |
| Temperature range between the softening point and the Fraas point | °C | >132 | >112 | 141 | 101 | 114 |

TABLE 2

| Example |  | 1a | 1b | 2a | 2b |
|---|---|---|---|---|---|
| Feedstock |  |  |  |  |  |
| Rubber | % by wt. | 10 | 10 | 10 | 10 |
| Flux | % by wt. | 40 | 40 | 40 | 40 |
| Bitumen | % of wt. | 50 | 50 | 50 | 50 |
|  |  | 100 | 100 | 100 | 100 |
| Polyethylene (based on blown product) | % wt. | — | 1 | — | 1 |
| Blowing |  |  |  |  |  |
| Total time | hrs. | 18 | 19 | 14 | 15 |
| Initial at 220°C | hrs. | 5 | 5 | 5 | 5 |
| Final at 250°C | hrs. | 13 | 14 | 9 | 10 |
| Softening point, ball & ring, | °C | 91 | 105 | 74 | 103 |
| Penetration, | mm/10 | 65 | 40 | 90 | 70 |
| Fraass breaking point, | °C | below −40 | below −40 | below −40 | below −40 |
| Penetration index |  | +6.4 | +6.5 | +5.3 | +7.5 |
| Temperature range between the softening point and the Fraas point | °C | >131 | >145 | >114 | >143 |

TABLE 3

| Example |  | 1a | 1b | 1c | 2 |
|---|---|---|---|---|---|
| Feedstock |  |  |  |  |  |
| Rubber | % by wt. | 10 | 10 | 10 | 5 |
| Flux | % by wt. | 40 | 40 | 40 | 45 |
| Bitumen | % by wt. | 50 | 50 | 50 | 50 |
|  |  | 100 | 100 | 100 | 100 |
| Polyethylene addition (based on blown product) | % wt. | — | — | 1 | 2 |
| Sulphur (parts by wt.) to 100 parts by wt. rubber |  | — | 1 | 1 | 4 |
| Blowing |  |  |  |  |  |
| Total time | hrs. | 5 | 5 | 5 | 6 |
| Initial at 220°C | hrs. | 5 | 5 | 5 | 6 |
| uz.1/64 Final at 250°C | hrs. | — | — | — | — |
| Properties of product |  |  |  |  |  |
| Softening point, ball & ring, | °C | 61 | 70 | 103 | 87 |
| Penetration, | mm/10 | 185 | 125 | 107 | 161 |
| Fraass breaking point, | °C | below −40 | below −40 | below −40 | −33 |
| Penetration index |  | +5.8 | +5.8 | +9.3 | +8.7 |
| Temperature range between the softening point and the Fraas point | °C | >101 | >110 | >143 | 120 |

TABLE 4

| Feedstock | | | | INVENTION | | | | | | | BITUMEN (Comparison) Commercial Grades | |
|---|---|---|---|---|---|---|---|---|---|---|---|---|
| Rubber | % wt. | | 10 | | | 10 | | | 10 | | | |
| Flux | % wt. | | 40 | | | 30 | | | 40 | | | |
| Bitumen | % wt. | | 50 | | | 60 | | | 50 | | | |
| Sulphur (Parts per 100 parts rubber) | | | 2 | | | 2 | | | 0.5 | | | |
| Polyethylene | % wt. | 0 | 1 | 2 | 0 | 1 | 2 | 0 | 1 | 2 | 80/100 | 100/125 |
| Results | | | | | | | | | | | | |
| Softening Point | °C | 61 | 86 | 94 | 67 | 97 | 109 | 100 | 112 | 118 | 85 | 100 |
| Penetration at 25°C | mm/10 | 125 | 98 | 92 | 100 | 83 | 72 | 65 | 51 | 49 | 25 | 25 |
| Flow Length  5h | (mm at 80°C) | >200 | 59 | 13 | 170 | 18 | 4 | 43 | 5 | 2 | 115 | 15 |
| do.  24h | | | 86 | 19 | >200 | 32 | 11 | 81 | 10 | 6 | 201 | 30 |
| Limestone filler | | | | | | | | | | | | |
| do.  5h | 30% | >200 | 40 | ~10 | 109 | 15 | ~5 | 19 | ~1 | ~1 | 90 | 16 |
| do.  24h | 30% | | 57 | ~10 | 186 | 26 | ~7 | 69 | ~6 | ~1 | 164 | 27 |
| do.  5h | 50% | 161 | 10 | ~1 | 18 | ~1 | ~1 | 2 | ~1 | ~1 | 70 | 5 |
| do.  24h | 50% | >200 | 23 | ~1 | 88 | ~5 | ~1 | 12 | ~1 | ~1 | 120 | 13 |

We claim:
1. A method of preparing an asphaltic composition suitable for use as a roof surfacing material, which comprises
  1. forming a mixture of:
    23–85% wt, based on the total mixture, of an asphalt which is a distillation residue derived from crude petroleum,
    2–25 % wt, based on the total mixture, of a rubber which is a copolymer of (a) monolefines and (b) cyclic hydrocarbons with an endocyclic bridge and at least two olefinic double bonds,
    10–75% wt, based on the total mixture, of a flux oil which is an aromatic extract for extending the rubber,
    0–4 parts by weight sulphur per 100 parts by weight of the rubber, and
    0–3% wt, based on the total mixture, of a polyolefine selected from the group consisting of polyethylene and polypropylene, and
  2. blowing the mixture with a gas which contains elemental exygen, at a temperature of 150° – 300°C.
2. A method according to claim 1, in which the rubber is a copolymer of (a) mono-olefines and (b) dicyclopentadiene.
3. A method according to claim 2, in which the rubber is a copolymer of ethylene, propylene and dicyclopentadiene.
4. A method according to claim 1, in which the blowing is carried out in two stages, the first stage being carried out at 220°– 230°C and the second at 250°C.
5. A method according to claim 1, in which the blowing gas is air.
6. A method of preparing an asphaltic composition, suitable for use as a roof surfacing material, which comprises
  1. forming a mixture of:
    85–10% wt., based on the total mixture, of an asphalt which is a distillation residue derived from crude petroleum,
    5–15% wt., based on the total mixture, of a rubber which is a copolymer of ethylene, propylene and dicyclopentadiene, and
    10–75% wt., based on the total mixture, of an aromatic extract, and
  2. blowing the mixture with air at a temperature of 150° – 300°C.
7. A method according to claim 6, in which the blowing is carried out in two stages, the first stage being carried out at 220 – 230°C and the second at 250°C.
8. A method of preparing an asphaltic composition, suitable for use as a roof surfacing material, which comprises
  (1) forming a mixture of:
    85–10% wt., based on the total mixture, of an asphalt which is a distillation residue derived from crude petroleum,
    5–15% wt., based on the total mixture, of a rubber which is a copolymer of ethylene, propylene and dicyclopentadiene,
    10–75% wt., based on the total mixture, of an aromatic extract, and
    1–4 parts by weight sulphur per 100 parts by weight of the rubber, and
  (2) blowing the mixture with air at a temperature of 150° – 300°C.
9. A method according to claim 8, in which the blowing is carried out in two stages, the first stage being carried out at 220° – 230°C and the second at 250°C.
10. A method of preparing an asphaltic composition, suitable for use as a roof surfacing material, which comprises
  1. forming a mixture of:
    85–10% wt., based on the total mixture, of an asphalt which is a distillation residue derived from a crude petroleum,
    5–15% wt., based on the total mixture, of a rubber which is a co-polymer of ethylene, propylene and dicyclopentadiene,
    10 – 72% wt., based on the total mixture, of an aromatic extract,
    1 – 3% wt. of low pressure polyethylene or polypropylene, and
  2. blowing the mixture with air at a temperature of 220° – 230°C.

* * * * *

UNITED STATES PATENT AND TRADEMARK OFFICE
CERTIFICATE OF CORRECTION

PATENT NO. : 3,853,799
DATED : December 10, 1974
INVENTOR(S) : Rolf-Dieter Behling, Manfred Oelsner, Gunther Zenke It is certified that error appears in the above-identified patent and that said Letters Patent are hereby corrected as shown below:

Column 1, line 18     "The" should be --This--

Column 2, line 20     "joining" should be --jointing--

Column 5, line 28     "monolefines" should be --mono-olefins--

Column 5, line 40     "exygen" should be --oxygen--

Signed and Sealed this fifth Day of August 1975

[SEAL]

Attest:

RUTH C. MASON
Attesting Officer

C. MARSHALL DANN
Commissioner of Patents and Trademarks